United States Patent [19]

Houmand et al.

[11] Patent Number: 5,588,818

[45] Date of Patent: Dec. 31, 1996

[54] ROTOR-TO-ROTOR COUPLING

[75] Inventors: Mitchell J. Houmand, Richmond; James E. Kraus, Kingwood, both of Tex.

[73] Assignee: Horizon Directional Systems, Inc., Houston, Tex.

[21] Appl. No.: 433,544

[22] Filed: Apr. 20, 1995

[51] Int. Cl.$^6$ ............................... F03C 2/08; F16D 1/08
[52] U.S. Cl. ........................ 418/5; 418/48; 403/356; 464/155
[58] Field of Search ................ 418/48, 60, 200, 418/210, 5; 464/155, 156; 175/107; 403/355–358

[56] References Cited

U.S. PATENT DOCUMENTS

| | | | |
|---|---|---|---|
| 60,403 | 12/1866 | Mears et al. | 464/106 |
| 2,354,184 | 7/1944 | Daniel | 464/106 |
| 2,760,358 | 8/1956 | Helm et al. | 464/106 |
| 3,232,362 | 2/1966 | Cullen et al. | 175/104 |
| 3,260,069 | 7/1966 | Neilson et al. | 464/16 |
| 3,260,318 | 7/1966 | Neilson et al. | 175/75 |
| 3,732,706 | 5/1973 | Evans | 464/155 |
| 3,840,080 | 10/1974 | Berryman | 175/107 |
| 3,902,464 | 9/1975 | Lay | 418/60 |
| 3,936,247 | 2/1976 | Tschirky et al. | 418/48 |
| 3,999,901 | 12/1976 | Tschirky | 418/48 |
| 4,034,574 | 7/1977 | Kuder | 464/106 |
| 4,047,581 | 9/1977 | Erickson | 175/107 |
| 4,080,079 | 3/1978 | Waara | 403/57 |
| 4,141,225 | 2/1979 | Varner | 175/57 |
| 4,188,801 | 2/1980 | Hugh et al. | 464/106 |
| 4,244,195 | 1/1981 | Rutter et al. | 464/106 |
| 4,246,976 | 1/1981 | McDonald et al. | 175/107 |
| 4,256,189 | 3/1981 | Fox et al. | 175/107 |
| 4,265,323 | 5/1981 | Juergens | 175/107 |
| 4,284,149 | 8/1981 | Fox | 175/107 |
| 4,295,535 | 10/1981 | Crase et al. | 175/107 |
| 4,368,786 | 1/1983 | Cousins | 175/78 |
| 4,636,151 | 1/1987 | Eppink | 418/48 |
| 4,683,964 | 8/1987 | Wenzel | 175/107 |
| 4,764,094 | 8/1988 | Baldenko et al. | 418/48 |
| 4,772,246 | 9/1988 | Wenzel | 464/117 |
| 4,811,798 | 3/1989 | Falgout, Sr. et al. | 175/73 |
| 4,904,228 | 2/1990 | Frear et al. | 464/152 |
| 5,000,723 | 3/1991 | Livingstone | 464/140 |
| 5,052,501 | 10/1991 | Wenzel et al. | 175/74 |
| 5,101,914 | 4/1992 | Wenzel | 175/74 |
| 5,135,059 | 8/1992 | Turner et al. | 175/107 |
| 5,217,080 | 6/1993 | Wenzel et al. | 175/107 |
| 5,267,905 | 12/1993 | Wenzel et al. | 464/140 |

OTHER PUBLICATIONS

Smith International, Photos 4–3/4 Sealed B.A. Driveshaft Cap, HIH 92–001, 2 Sheets (Date Unknown).
BAFCO International Co. –Parts List –3-3/4" Flex Drill PL36008 (Revised Jul. 13, 1994).
Applied Drilling Engineering –First Printing, Society of Petroleum Engineers, Richardson, TX 1986, pp. 407–410.
Polygon, Design Reference Sheet No. DRS 2.0, 2.14, (Miscellaneous Pages, 7 Sheets Total) Stoffel Polygon Systems (Date Unknown).
Controlled Directional Drilling –Unit III –Lesson 1 –Third Edition, Nancy J. Janicek, Petroleum Extension Service, 1984.
D–100 Torsion Rod, 7–3/4", Photos, 2 Sheets, (Date Unknown).

*Primary Examiner*—John J. Vrablik
*Attorney, Agent, or Firm*—Pravel, Hewitt, Kimball & Krieger

[57] ABSTRACT

A rotor to rotor coupling providing a connecting rod having longitudinal grooves mating to longitudinal grooves in a rotor end. The mated grooves forming chambers for which pins are received therein. A rotor cap secures the captured pins within the chambers and further strengthens the coupling. An optional thrust bearing assembly is disclosed along with a preferred method of synchronizing the rotors and timing the stators.

20 Claims, 7 Drawing Sheets

ROTOR-TO-ROTOR COUPLING

BACKGROUND OF THE INVENTION

1. Field of the Invention

The invention relates to a downhole drilling coupling and more particularly to a rotor-to-rotor coupling for synchronizing two positive displacement motors.

2. Background of the Invention

In the oil and gas industry, downhole drilling motors have been used for many years, especially in directional drilling. Typically, the drilling motor is contained in a housing, and supplies a rotational force by way of a drive shaft for turning a drill bit. The motor housing is connected to the lower end of a conventional drill string comprised of sections of drill pipe and drill collars. The drill string extends to the surface, where it is connected to a kelly, mounted in the rotary table of a drilling rig.

As the drilling begins, drilling fluid is pumped down through the drill string to the bottom of the bore hole and back up to remove the cuttings resulting from the drilling operation. Since the drilling fluid is constantly flowing through the drill string, a positive displacement motor is commonly used.

Positive displacement motors, or Moineau motors, have fixed volumetric displacement and, thus, their speed is directly proportional to the flow rate. These types of motors are well known in the art. The positive displacement motor (PDM) comprises a helical rotor within a helical cavity of a stator. The stator is bonded to the housing of the motor and is composed of rubber or rubber-like helical lobes, or threads for coacting with the helical rotor. The number of stator lobes is one more than the number of rotor lobes, thus creating a number of chambers along the length of the stator. As the drilling fluid is pumped down the drill string, under pressure, and through the cavity of the stator, the fluid imparts a torque to the rotor, causing the rotor to turn and pass the fluid from chamber to chamber. As the helical rotor rotates, it also orbits eccentrically about the axis of the stator in a reverse direction relative to its axial rotation. The rotor torque is then transferred to the drive shaft of the drill bit by a universal joint.

The torque developed by the PDM is also well understood to be proportional to the rotor pitch (or distance the fluid advances in one rotation of the rotor) and the number of rotor and stator lobes. While in theory, one long motor section provides a large amount of torque, in practice, single long sections have not been used with much success. Manufacturing, transportation and handling practicalities limit the length. Further, if any part of the motor malfunctions, the entire motor must be removed and replaced. This is particularly true of the stator. As the stator must have an effective hydraulic seal around the rotor, it is a vulnerable portion of the motor because it is subjected to continuous rubbing and deformation by the rotor. Additionally, the stator and rotor are subjected to abrasive and corrosive drilling fluids and salts. Thus, replacement of worn stators is routine. To further reduce the abrasive effects of the downhole environment, the rotors are chrome plated. When the chrome is damaged along any part of the rotor body it becomes susceptible to failure from corrosion and the entire rotor body must be rechromed which is costly.

Multilobed motors provide more torque but at a lower rotational speed. Thus, it is desirable to produce the large amounts of torque possible with the long motor and multilobed motors, while avoiding the manufacturing, handling, transportation and costly maintenance problems associated with long motor sections.

One way of simulating a long motor is to connect together several shorter motors in series, as described in Tschirky, U.S. Pat. No. 3,999,901. However, as each rotor is designed to eccentrically orbit within its own stator, difficulty in connecting the multiple motors together has resulted in limited success for this arrangement. Tschirky discloses a method for connecting the rotors in which the rotors are simply welded together. Welding the rotors together effectively eliminates the benefits of having separate motors. Another method described in Tschirky utilizes a pair of universal joints. The universal joints transfer torque between the rotors while permitting the rotors to eccentrically orbit within their respective stators, but out of phase with one another. While a universal joint may provide a working connection, it suffers from certain problems. The harsh environment of operating in the drilling fluid causes the universal joints to corrode and wear quickly. Additionally, the out of phase rotor operation causes a slight longitudinal movement that results in power transfer inefficiencies, instability and above normal wear on the stator.

Thus, it would be desirable to have a sturdy rotor-to-rotor coupling that allows two positive displacement motors to be releasably connected in series for increased torque but without the wear joints or moving bearing assemblies common in universal joints. It is also desirable to provide a sturdy rotor-to-rotor coupling to minimize the wear on the stators, and improve overall stability of the downhole motor arrangement.

SUMMARY OF THE INVENTION

A rotor coupling according to the present invention includes a connecting rod for being telescopically received into a cavity of a rotor end. The rotor cavity provides a plurality of elongated longitudinal grooves in its cavity side wall and the connecting rod provides a plurality of elongated longitudinal grooves on its outer surface. When the connecting rod is received into the cavity, the grooves align to form a plurality of elongated chambers.

A plurality of elongated drive pins are disposed in the chambers for engaging the connecting rod and the rotor. A tubular rotor cap, placed over the connecting rod, provides threads on its outer surface to mate with threads on the cavity side wall for maintaining the drive pins in the chambers and thereby securing the connecting rod to the rotor. The drive pins and the rotor cap provide a stable coupling in which, in operation, omnidirectional movement of the connecting rod with respect to the rotor is effectively eliminated. Because omnidirectional movement is effectively eliminated, rotors coupled at each end of the connecting rod are substantially coaxial.

In the assembly of the dual rotor assembly, the rotors are preferably synchronized with respect to each other. In the assembly of the dual motor assembly, the stators are preferably timed to their respective rotors. For this purpose, a synchronizing pin with a correspondingly sized chamber and a method of timing the stators is conveniently provided.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION OF PREFERRED EMBODIMENT

Reference will now be made in detail to a preferred embodiment of the invention, an example of which is illustrated in the accompanying drawings.

Figure 1:
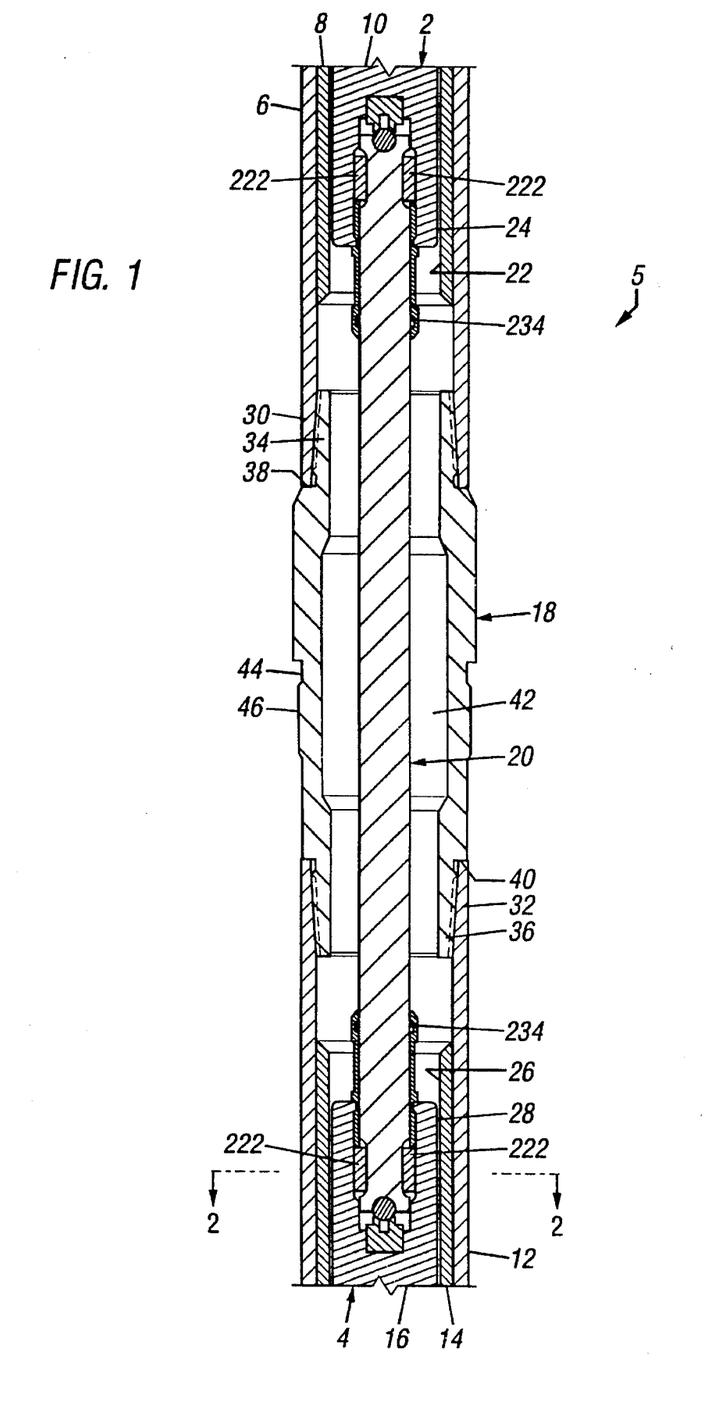
FIG. 1 illustrates a longitudinal cross-section of the coupling according to the preferred embodiment of the invention.

With reference to FIG. 1, an upper positive displacement motor 2 is shown coupled to a lower positive displacement motor 4 by way of coupling assembly 5. As shown, the upper motor 2 includes an outer housing 6, a stator 8 having a helical inner wall 22 and a helical rotor 10 having a helical outer wall 24 for hydraulically coacting with the stator 8. The lower motor 4 similarly includes an outer housing 12, a helical stator 14 having a helical inner wall 26, and a helical rotor 16 having a helical outer wall 28 for hydraulically coacting with the stator 14. In practice, the upper portion (not shown) of the upper motor 2 would be operatively connected to an uphole drill string with the lower portion (not shown) of the lower motor 4 being operatively connected to the drive shaft of a drill bit. The motors 2 and 4 are disposed end-to-end and connected in series by the coupling assembly 5 at the housings 6 and 12 by way of adapter 18, and at the rotors 10 and 16 by way of connecting rod 20, which operates to transfer axial and rotational forces between the motors 2 and 4. As will be more fully explained below, the connecting rod 20 and the adapter 18 also synchronize the motors 2 and 4 to allow for a very efficient dual power motor arrangement.

The housings 6 and 12 have threaded box ends 30 and 32 for engaging threaded pin ends 34 and 36 of the adapter 18. The housings 6 and 12 screw onto the adapter 18 and bear against shoulders 38 and 40 of the adapter 18. Optionally, an annular shim 200 (FIG. 3) may be installed over a pin end and adjacent a shoulder of the adapter for timing the stators. A preferred method of timing the stators is described below.

The adapter 18 has a hollow cylindrical bore 42, extending entirely through the adapter 18 for passing the drilling fluid from one motor to another and for housing the connecting rod 20. The exterior surface of the adapter 18 may conveniently include annular notch 44 and externally threaded annular rib 46 for mounting a guide sleeve (not shown) for the drill string. To protect the notch 44 and rib 46 when the guide sleeve is not used, a protective sleeve (not shown) may be placed over the threaded rib 46.

Before continuing with further description of the coupling assembly 5, it may be helpful to briefly describe the rotational forces involved when a positive displacement motor is operating in a drill string. Because the upper rotor operates in an identical fashion, only the lower rotor is shown and described in detail.

Figure 2:
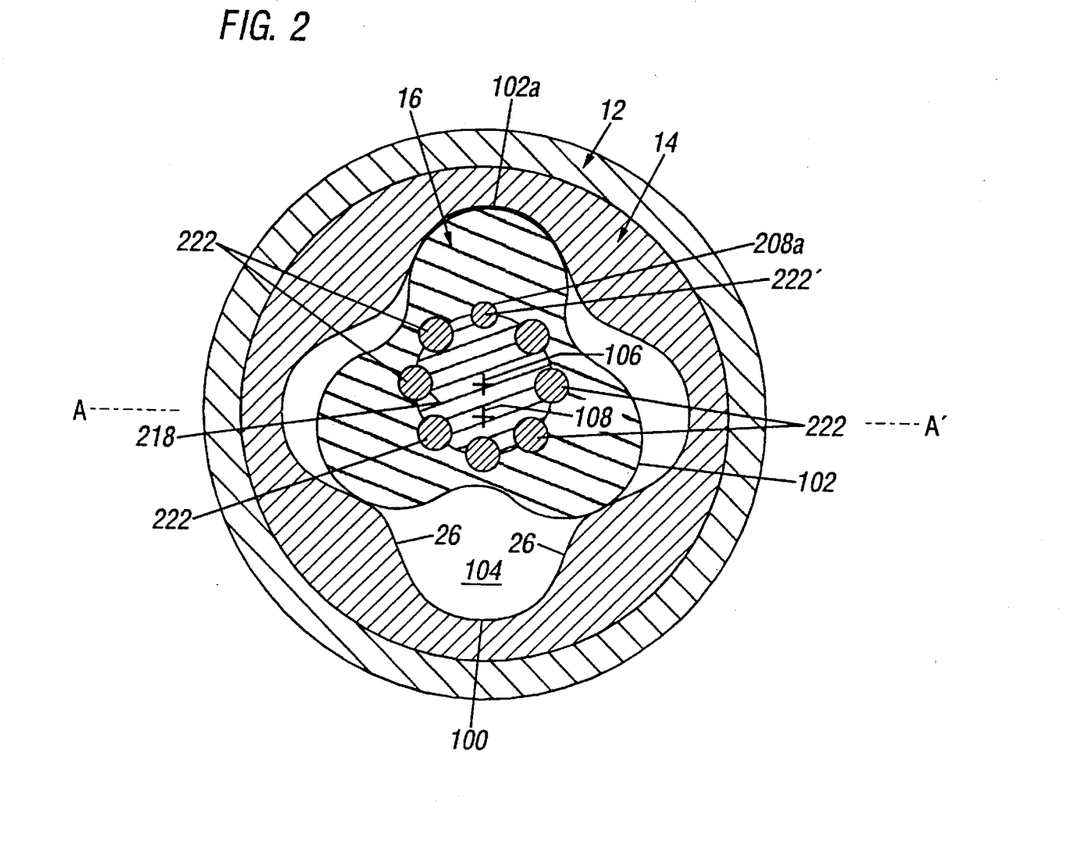
FIG. 2 illustrates a cross-section taken at line 2–2' of FIG. 1.

As best shown in FIGS. 1 and 2, the stator 14 is secured to the housing 12 and has a plurality of helical lobes 100, or threads forming an helical inner wall 26 about an axis 108. As is conventional with positive displacement motors, the rotor 16 has at least one helical lobe 102, but always one less than the number of stator lobes. Therefore, the stator pitch length is defined as the rotor pitch length multiplied by the number of stator lobes and divided by the number of rotor lobes (see FIG. 4c). For purposes of illustration, the drawing shows four stator lobes and three rotor lobes. However, as will be more fully appreciated in light of the discussion below, the invention can be used to couple together single lobe positive displacement motors or multilobe motors of any number of lobes, as long as the stator lobes number one more than the rotor lobes.

Since the number of stator lobes is one more than the number of rotor lobes, a series of helical chambers 104 (FIG. 2) are created along the length of the motor 4 between the stator 14 and the rotor 16. In the operation of the motor, as drilling fluid is pumped down the drill string, under pressure, and through the helical inner wall 26 of the stator 14, the fluid passes into the chambers 104 and imparts a torque on the rotor 16, causing the rotor 16 to turn and pass the fluid from chamber to chamber. Since when two motors are connected in series, the drilling fluid must pass through both motors, the rotational velocity of the coupled rotors will be substantially identical. As each helical rotor rotates about its axis 106, it also orbits eccentrically about the axis 108 of its associated stator 14 in a reverse direction relative to its axial rotation.

Because of the eccentricity of the orbital axis of the rotors, coupling the rotors by welding them end-to-end creates a stress point and hence weakness at the weld. A conventional universal joint can be used, but with a significant loss of power due to wobble through the joint and improper timing. In addition, the abrasive and corrosive drilling fluid quickly wears away the moving joint interfaces of the universal joint.

Figure 3:
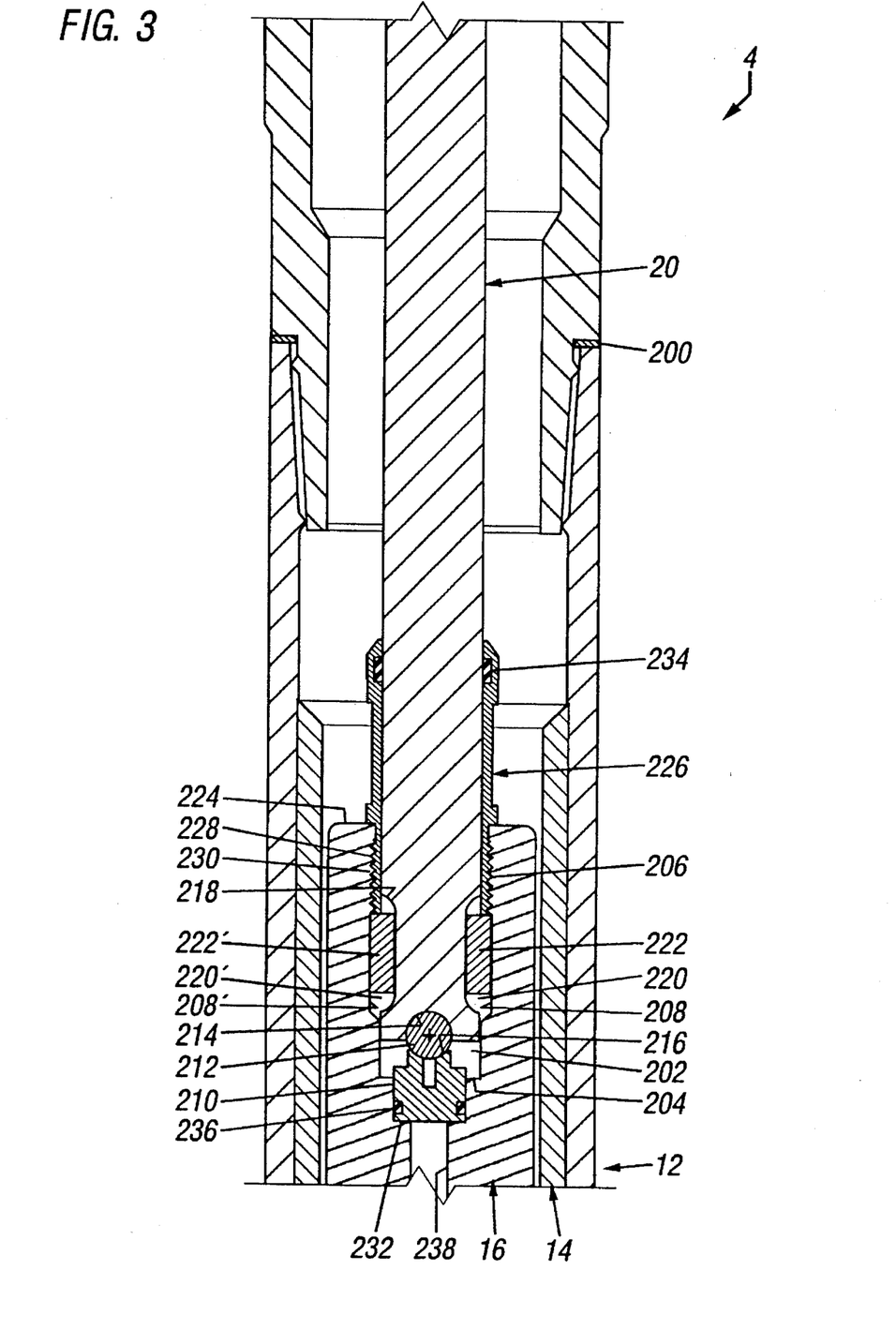
FIG. 3 illustrates an enlarged view of the lower motor coupling of FIG. 1.

With reference to FIG. 3, the preferred embodiment of a rotor-to-rotor coupling in accordance with the invention will now be described in detail. Again, since the upper rotor connection is substantially the same as the lower rotor connection, only the lower rotor connection will be described in detail.

With reference to FIGS. 2 and 3, upper end 224 of the lower rotor 16 provides a cavity 202, centered about the lower rotor axis 106 and having a terminal end 204 and a side wall 206. In accordance with the present invention, a plurality of annularly spaced, internal elongated longitudinal grooves 208 are provided along the rotor side wall 26 and parallel to its axis 106. Although not necessary to the practice of the invention, in the preferred embodiment, at least one of the rotor grooves 208, e.g. 208a, is conveniently centered on a radius which intersects the top or crown of one of the rotor lobes, e.g. rotor lobe crest 102a. As will be appreciated in light of the further description below, the rotor cavity terminal end 204 may conveniently be provided with a cutout portion 232 (FIG. 3) for receiving thrust pin 210 for cooperating with thrust ball 212 to provide a bearing assembly for taking up thrust forces between the rotor and the connecting rod 20.

As best shown in FIG. 3, the connecting rod 20 includes a plurality of annularly spaced, external, elongated longitudinal grooves 218 running parallel to the connecting rod 20 axis which, as illustrated, is coaxial with the lower rotor axis 106 axis of the connecting rod 20. At each terminal end of the connecting rod 20, the rod grooves 218 are preferably placed at identical angular placements relative to the connecting rod axis so that proximal and distal terminal end grooves are coaxial. The connecting rod 20 is sized to be telescopically received into the cavity 202.

Although not essential for the practice of the invention, as shown, a thrust pin 210 and a thrust ball 212 may be provided for transferring axial forces from the rotor 16 to the coupling rod 20. For this purpose, the terminal end of connecting rod 20 includes a ball socket 214 and the thrust pin 210 includes a corresponding seat 216. With this arrangement, the thrust ball 212 or thrust pin 210 can be replaced during routine maintenance. The thrust pin 210 includes an o-ring 236 to prevent abrasive drilling fluids from entering the terminal end 202 from a rotor bore 238. The rotor bore 238 is present in certain rotors to allow drilling fluids to pass. In the operation of the rotor with the thrust ball assembly, lubricants are placed in the terminal end 202 and o-rings 234 and 236 provide effective sealing from the drilling fluids. As can be appreciated, the connecting rod could be sized to bear directly on the end 204 of the rotor cavity 202 to minimize parts, if wear on the connecting rod is not of substantial concern.

The connecting rod grooves 218 and the internal rotor grooves 208 are preferably sized and mated so that, when the rotor-to-rotor coupling is assembled, adjoining groove pairs form a plurality of elongated pin chambers 220. Although in the illustrated embodiment the elongated pin chambers 220 are cylindrical for ease of machining, as will be appreciated, the chambers 220 can be any elongated shape. A number of elongated pins 222, equal to the number of chambers 220, are provided for placement within the chambers 220 for coupling the connecting rod 20 to the rotor 16 and for transferring rotational forces between the rotors. The elongated pins 222 are preferably sized to closely fit into the chambers 220 to substantially prevent omnidirectional movement between the coupling rod 20 and the rotor 16.

To complete the lower coupling assembly, a rotor cap 226 is provided having annular threads 228 on an exterior surface of the cap for engaging corresponding threads 230 on the rotor side wall 206. The rotor cap 226 functions to secure the rotor to the connecting rod 20 by containing the pins 222 within their chambers 220 and to further limit omnidirectional movement of the connecting rod 20 relative to the rotor 16. An O-ring 234 on an inner surface of the rotor cap is provided such that in conjunction with the threaded fitting, the cavity 202 is sealed from the drilling fluid.

Therefore, by providing a coupling with elongated drive pins, in the operation of the rotor to rotor coupling, the rotors are coaxially positioned for synchronous eccentrical orbit of their respective stators, which results in a very sturdy coupling without the wear points of the prior art couplings. As will be discussed below, the coaxial rotor alignment also permits performance benefits by synchronizing the rotors and timing the stators.

Figure 6:
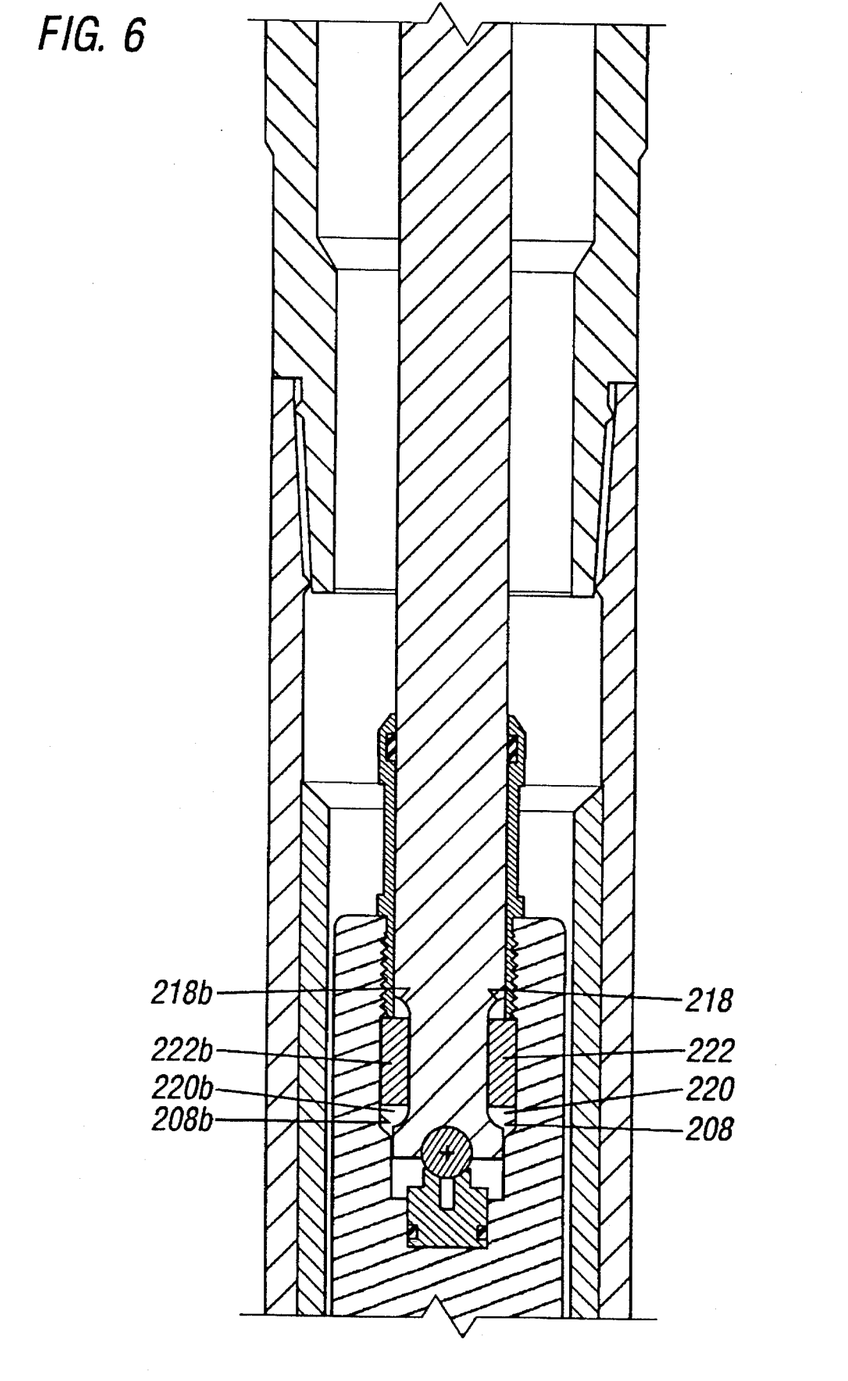
FIG. 6 illustrates a longitudinal cross-section of the coupling according to an alternative embodiment.

An alternative embodiment includes the plurality of elongated chambers 220 in a longitudinally staggered formation, as shown in FIG. 6. Rotor grooves 208 are longitudinally staggered from rotor grooves 208b, and connecting rod grooves 218 are longitudinally staggered from connecting rod grooves 218b to form a plurality of elongated chambers 220b which are longitudinally staggered from the plurality of longitudinal chambers 220. A plurality of pins 222 are received into both the staggered chambers 220b and the unstaggered chambers 220. Thus, when the rotor cap 226 is threaded into the rotor, only the elongated pins 222 in the unstaggered chambers 220 will be in close proximity, about ¹⁄₁₆", to the rotor cap 226. In a variation of this alternative embodiment, a plurality of pins 222b having a shorter length are provided for placing into the plurality of chambers 220 for producing a similar effect as the staggered formation.

Figure 4A:
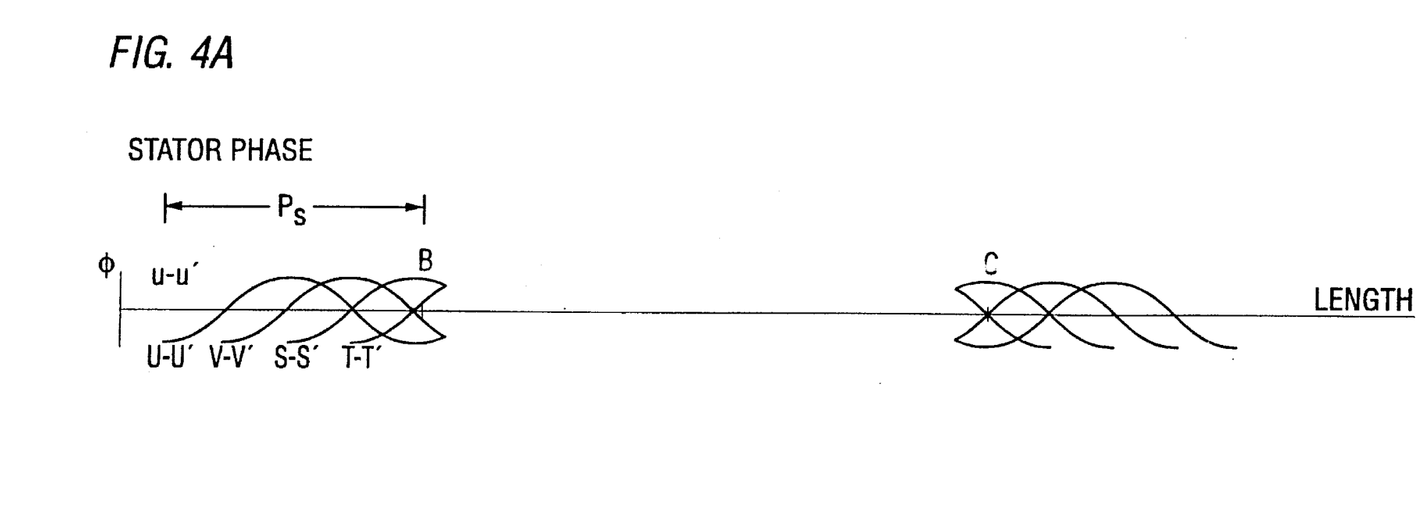
FIG. 4a illustrates the phase relationships of the stator lobes along the length of the stators.
Figure 4B:
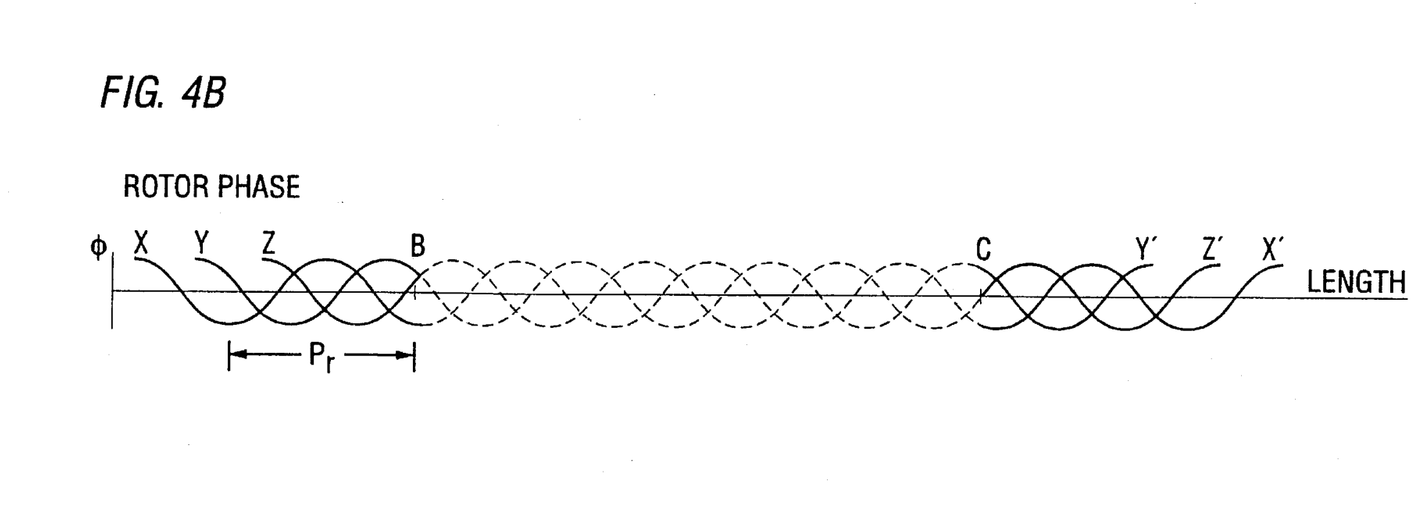
FIG. 4b illustrates the phase relationships of the rotor lobes along the rotors, and projected along the connecting rod.

As can be appreciated, misalignment of a stator relative to its rotor creates additional, unnecessary wear on the rubber stator. Although not necessary to achieve the positive torque transfer and durability advantages of the invention, enhanced efficiency can be achieved by synchronizing the rotors 10 and 16 being coupled. Keeping in mind the earlier explanation of the operation of a positive displacement motor, it will be appreciated that the upper and lower motors will be in synch when the rotors are in synch with one another and the stators are properly timed to their respective rotors. As used herein, the term "in synch" refers to the condition in which coupled rotors are both coaxially and phase aligned. Coaxial alignment occurs when the rotors are coupled together according to the coupling assembly 5 described above. Phase alignment occurs when, for a given rotor separation, the helical lobes of respective rotors are rotationally positioned such that a continuous phase relationship exists between the separated rotors, as illustrated in FIG. 4b.

For this purpose, as shown in FIG. 3, one of the pins 222, labeled 222', is conveniently sized and located to be a synchronizing pin. The synchronizing pin 222' and its corresponding chamber labeled 220' in FIG. 3, are sized differently from the other pins 222 and chambers 220 for synchronizing the rotors during assembly. As can be appreciated, positioning of the rotors for "in phase" alignment is dependant upon rotor separation and relative rotational positioning. Although not required, in the preferred embodiment, the rotor separation distance is conveniently set to equal an integer multiple of the rotor pitch lengths ($P_r$) divided by the number of rotor lobes. Therefore, to provide an "in phase" alignment, the rotors only need to have identical rotational positioning. This is conveniently provided by the synchronizing pin 222'. The axis of the synchronizing pin 222' (FIG. 2) preferably intersects a radius between the rotor axis 106 and the top or crest of a lobe, e.g. lobe crest 102a. Thus, with the synchronizing pin feature and properly dimensioned components, synchronization of the upper and lower rotors is assured. As can be appreciated, pin and chamber shapes, placement, spacing and number can be varied depending on the available size and wall thickness of the rotor cavity and manufacturing preferences. Rotor to rotor phase alignment can be accomplished by machining upper rotor pin grooves in the same position relative to a particular lobe crest of the upper rotor as the lower rotor pin grooves are positioned relative to a particular lobe crest of the lower rotor. The additional use of the synchronizing pin 222' and corresponding pin chambers 220' assure that for a given separation, the rotor to rotor coupling will always be assembled in phase, as illustrated in FIG. 4b. In a variation of the synchronizing pin, a single rotor groove 208, connecting rod groove 218 and pin 222 are omitted, thereby providing an alignment mechanism similar to the synchronizing pin which is especially useful on smaller diameter rotors and connecting rods.

Figure 4C:
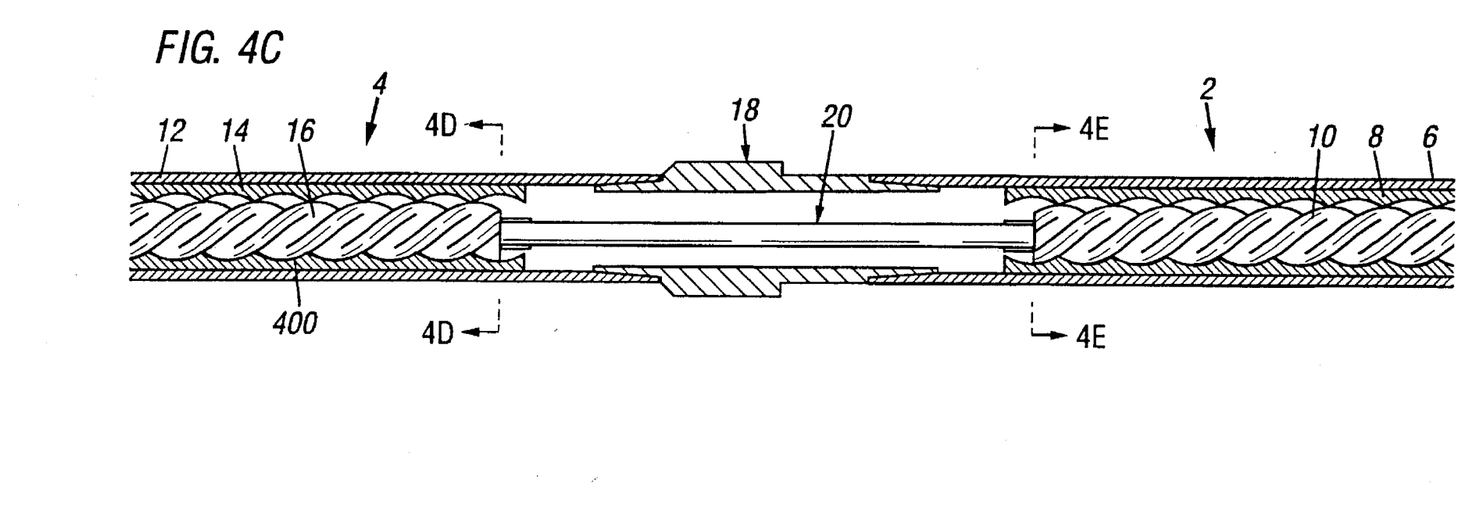
FIG. 4c illustrates a longitudinal cross-section of the synchronized dual motor arrangement.
Figure 4D:
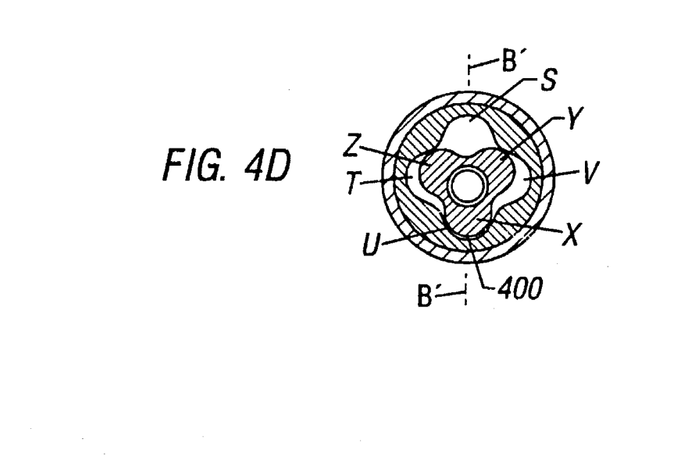
FIG. 4d illustrates a cross-section taken at line 4d–4d' of FIG. 4c.
Figure 4E:
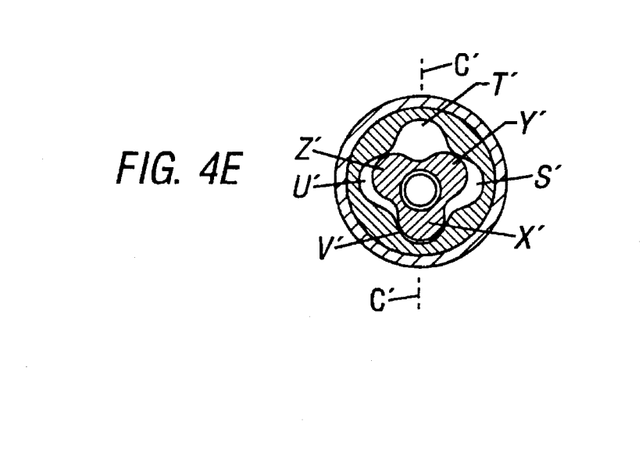
FIG. 4e illustrates a cross-section taken at line 4e–4e' of FIG. 4c.

Turning now to the timing of the stators, the phase diagrams of FIGS. 4a–4e illustrate the preferred alignment of the stators 8, 14 to their respective rotors 10 and 16. In the preferred rotor-to-rotor synchronization, the connecting rod 20 is conveniently dimensioned to separate the rotors 10 and 16 by a distance equal to an integer number of rotor pitch lengths ($P_r$) divided by the number of rotor lobes and the rotors are positioned "in phase" with respect to each other. As such, proper stator-to-rotor timing may also be achieved when the stators 8 and 14, or housings 6 and 12, are separated by a distance consistent with to the rotor separation distance and the stator lobes are also "in phase", as illustrated in FIGS. 4d and 4e.

FIGS. 4c and 4d illustrates a lobe X coacting with a longitudinal portion 400 of the helical inner wall 26 at a point B–B'. Proper stator alignment occurs, such as at the cross-section B–B', when, along the longitudinal portion 400, the rotor lobes are in phase with the stator lobes. Stator alignment is illustrated graphically in FIGS. 4a and 4b. Comparing FIGS. 4a and 4b, at point B, the rotor lobe X is shown to be intersecting the stator lobe U. Thus, at points along the longitudinal portion 400, the intersection of rotor and stator lobes in this manner result in a proper stator alignment with respect to the rotor.

As can be appreciated in the dual motor assembly, stator to rotor timing is dependant upon the distance between the stators and the stator rotational position about each respective rotor. As discussed above, although the dual rotor assembly is coaxially aligned by the rotor to rotor coupling, phase alignment of a dual rotor assembly is dependant upon the distance between the rotors and the relative rotational position of the rotors. Although the timing method herein described will apply to both "in phase" or "out of phase" dual rotor assemblies, it is preferable to use only "in phase" dual rotor assemblies, as will become apparent.

Figure 5A:
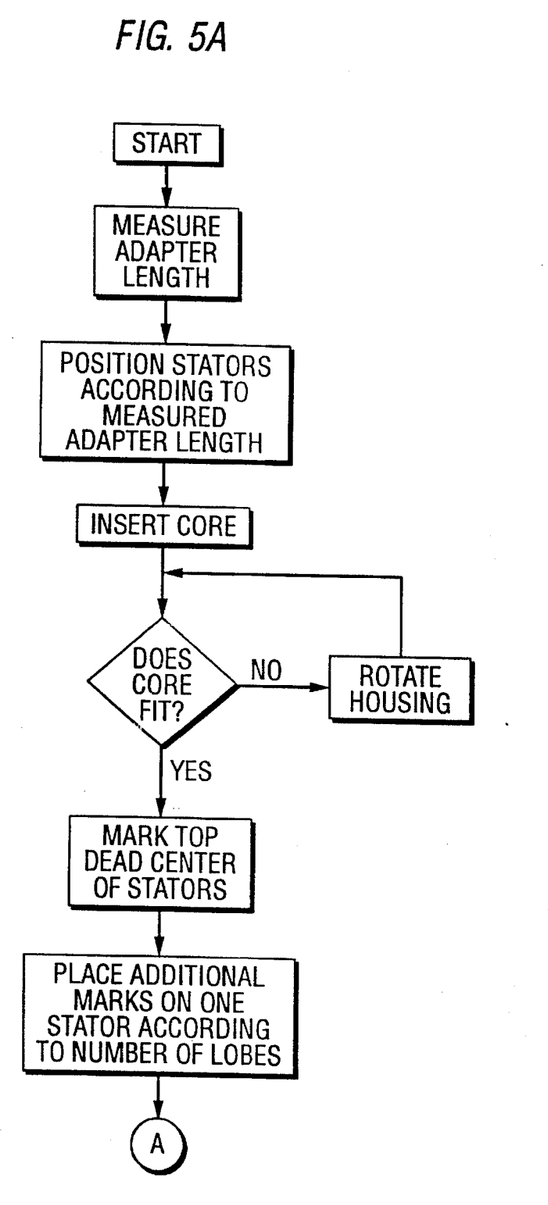
FIGS. 5a and 5b illustrates the method of aligning the stators according to the preferred embodiment of the invention.
Figure 5B:
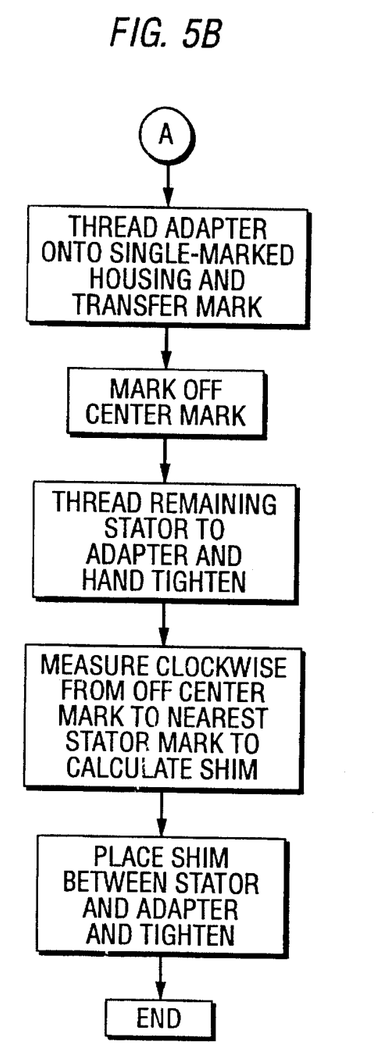

A preferred method of timing the stators is illustrated in the flow diagram of FIGS. 5a and 5b. A stator adapter housing 18 is provided for securing the upper and lower stators housings, 6 and 12. As shown in FIG. 5a, before coupling the housings, a distance between the shoulders 38 and 40, of the stator adapter housing 18 is measured. This is preferably a predetermined length, such as 15". Knowing this distance, the stator housings can be placed into a calibration rack with the stators rotatably separated by the measured distance.

Next a stator core is inserted through the upper and lower stators. The stator core can be made by using one of the stators to be coupled as a mold and any convenient molding compound, such as fiberglass/epoxy compound. Once the core is made, it can be used repeatedly for similarly sized and configured stators to be coupled. It is noted that the stator core has the same number of lobes as the stator. By using a mold of the stators, the stators will conveniently be "in phase" with respect to each other. It is further noted that although other methods of timing the stators can be employed, by utilizing the stator core, the dual rotor assembly is also conveniently required to be "in phase". If an "out of phase" rotor assembly is desired, then the stator core is simply cut in two and rotationally positioned backed together at the desired "out of phase" angle.

While inserting the stator core, it may be necessary to rotate one of the stator housings to slide the core through both stators. Once the stator core is inserted, top dead center of each stator is located and a mark is scribed on the exterior surface of each stator housing, adjacent its end. Thus, at this point, it is apparent that this is the desired rotational position of the stators for proper timing of the stators to the "in phase" rotors.

Next, a series of marks are calculated for placing about the circumference of one of the stator housings. The angular displacement of the marks is determined by dividing 360 degrees by the number of stator lobes. Thus, with reference to the top dead center mark, a series of marks are distributed about the circumference of the stator housing. The total number of marks will the number of stator lobes. For example, a six lobe stator will have six marks separated by 60 degrees each.

After the series of marks are placed on one of the stator housings, the stator adapter housing 18 is threaded and fully torqued onto the other stator housing. Next, the top dead center mark from the coupled stator housing is conveniently transferred onto the stator adapter housing to provide a better reading when the remaining stator is threaded. Next, with respect to the open end of the stator adapter housing, a second mark is placed 15 degrees counterclockwise from the top dead center mark. The off center mark represents the amount of rotation back to top dead center expected to fully tighten the stator to the stator adapter from a hand tightened position.

The remaining stator is then threaded clockwise and hand tightened onto the open end of the stator adapter housing. With respect to the hand tightened end of the stator adapter housing and from the off center mark, the closest mark clockwise from the off center mark is located. The stator is then rotated counterclockwise back to the off center mark and the gap is measured to determine a shim 200 (FIG. 3) width. Alternatively, the stator is fully torqued and the angle from the stator adapter housing top dead center to the first clockwise stator mark is measured to determine the shim width. Knowing the thread pitch, usually 0.25", the angle is readily translated into a shim 200 distance.

Finally, the stator is removed, the shim 200 is placed over the stator adapter housing pin end, and the stator is then threaded and fully torqued. Thus, by appropriately sizing a shim, the stators are timed for receiving the dual rotor assembly.

The foregoing disclosure and description of the invention are illustrative and explanatory thereof, and various changes in the size, shape, materials, as well as in the details of the illustrated embodiments and construction and method of operation may be made without departing from the spirit of the invention.

What is claimed is:

1. A rotor to rotor coupling comprising:

a rotor end having at least two, spaced apart, internal longitudinal grooves in a cavity adjacent the rotor end;

a connecting rod having at least two correspondingly spaced longitudinal, external grooves adjacent one end of the rod, wherein the rod end containing the external grooves is sized to be telescopically received within the rotor end containing the internal grooves such that the external and internal grooves form at least two spaced chambers;

at least two pins sized to fit within the spaced chambers; and means for releasably securing the rotor end to the rod end with the pins captured within the spaced chambers wherein the releasably securing means is sized to fit about the connecting rod and includes a threaded connector having at one end external threads for mating with internal threads within the rotor end cavity to contain the captured pins within the chambers.

2. The rotor to rotor coupling of claim 1, further comprising a thrust bearing assembly between the rotor end and the connecting rod end.

3. The rotor to rotor coupling of claim 2, wherein the thrust bearing assembly includes a thrust pin secured within the rotor end cavity and having a ball socket and wherein the connecting rod end incudes a ball socket corresponding to the thrust pin ball socket and a ball sized to fit within the thrust pin and connecting rod ball sockets.

4. A coupling for connecting a pair of positive displacement motors in series wherein each motor includes a rotor and a stator, the coupling comprising:
a rotor to rotor coupling assembly including
a rigid connecting rod having at least two spaced longitudinal, external grooves adjacent one end of the rod for mating with corresponding internal grooves in one end of a rotor, wherein the rod end containing the external grooves is sized to be telescopically received within the rotor end containing the internal grooves such that the external and internal grooves form at least two spaced chambers,
at least two pins sized to fit within the spaced chambers, and
means for releasably securing the rotor to the coupling rod end with the pins captured within the spaced chambers; and
a stator to stator coupling assembly including
a cylindrical housing having a bore therethrough and including releasable securing means at each of its terminal ends for releaseably securing the housing to the lower end of the stator of one of the motors and to the upper end of the stator of the other motor.

5. The coupling of claim 4, wherein the rotor to rotor releasably securing means is sized to fit about the connecting rod and includes a threaded connector having at one end external threads for mating with internal threads within the rotor end cavity to contain the captured pins within the chambers.

6. The coupling of claim 4, wherein when said rotor to rotor coupling is assembled, said pair of rotors are coaxially aligned.

7. The coupling of claim 6, wherein when said rotor to rotor coupling is assembled, said pair of rotors are aligned in phase with respect to each other.

8. The coupling of claim 4, wherein when said stator to stator coupling is assembled, said stators are timed to said rotors.

9. The coupling of claim 8, wherein when said stators are timed, said pairs of stators are aligned in phase with respect to each other.

10. The coupling of claim 4, wherein said cylindrical housing further includes a shim placed adjacent to one of the terminal ends, the shim having a width for causing said stators to be timed to said rotors.

11. The coupling of claim 10, wherein when said stators are timed, said pairs of stators are aligned in phase with respect to each other.

12. The coupling of claim 4, wherein one of said spaced chambers is sized different to form a synchronizing chamber and wherein one of said pins is sized to fit within the differently sized synchronizing chamber.

13. The coupling of claim 4, further comprising a thrust bearing assembly between the rotor end and the connecting rod end.

14. The coupling of claim 13, wherein the thrust bearing assembly includes a thrust pin secured within the rotor end cavity and having a ball socket and wherein the connecting rod end incudes a ball socket corresponding to the thrust pin ball socket and a ball sized to fit within the thrust pin and connecting rod ball sockets.

15. The coupling of claim 14, wherein the thrust pin includes a sealing ring and said releasably securing means includes a sealing ring for sealing the thrust bearing assembly.

16. The coupling of claim 4, wherein alternate ones of the external rod grooves are longitudinally staggered and alternate ones of the internal rotor grooves are longitudinally staggered such that alternate ones of the spaced chambers are longitudinally staggered.

17. The coupling of claim 4, wherein alternate ones of said pins are shorter than the others.

18. A coupling assembly for joining two helical rotors in series, each rotor having substantially the same pitch length, comprising:
a connecting rod having at least two spaced longitudinal, external grooves adjacent one end of the rod for mating with corresponding internal grooves in one end of a rotor, wherein the rod end containing the external grooves is sized to be telescopically received within the rotor end containing the internal grooves such that the external and internal grooves form at least two spaced chambers,
at least two pins sized to fit within the spaced chambers; and
means for releasably securing one end of one rotor to the rod end of the coupling assembly with the pins captured within the spaced chambers, wherein the coupling assembly is further sized to space the two rotors a distance equal to an integer multiple of the rotor pitch lengths.

19. The rotor to rotor coupling of claim 1, wherein alternate ones of the external rod grooves are longitudinally staggered and alternate ones of the internal rotor grooves are longitudinally staggered such that alternate ones of the spaced chambers are longitudinally staggered.

20. The rotor to rotor coupling of claim 1, wherein alternate ones of the pins are shorter than the others.

* * * * *